Patented Apr. 14, 1931                                                                    1,800,299

UNITED STATES PATENT OFFICE

GEORG KRÄNZLEIN, CHRISTOPH HARTMANN, AND ALBIN HARDT, OF HOCHST-ON-THE-MAIN, GERMANY, ASSIGNORS TO GENERAL ANILINE WORKS, INC., OF NEW YORK, N. Y., A CORPORATION OF DELAWARE

PIGMENT DYE AND PROCESS OF PREPARING IT

No Drawing. Application filed August 10, 1927, Serial No. 212,146, and in Germany September 11, 1926.

Our present invention relates to pigment dyes and process of preparing them.

We have found that dyestuffs containing one or several acid groups can be pigmented in an excellent manner by adding to the solutions of their salts a salt of an organic base containing the following group:

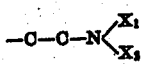

wherein $X_1$ and $X_2$ stand for hydrogen, alkyl or —C—C—, or $X_1$ and $X_2$ together for =C—C— said organic base dissolved in water having a sufficiently great basicity for a stable salt which is no longer or only difficultly capable of being hydrolized and which renders the dyestuffs insoluble or sparingly soluble in water. As such basic organic materials have proved to be particularly useful the dicyclohexylamine, trisubstituted melamines for instance of the following formula:

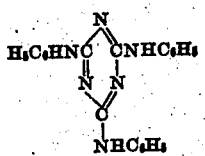

diethyl-beta-naphthylamine or the like and derivatives thereof.

The same pigments can also be obtained by causing the free dyestuff acids to react with the free bases, if necessary, in a suitable solvent as for instance concentrated or aqueous alcohol. In this case the pigments, if they are to be isolated, must be prepared by precipitating them from their alcoholic solution by means of agents such as for instance water, or by evaporation. Said pigment dyes are insoluble or difficultly soluble in water but soluble in many organic solvents.

The following examples serve to illustrate our invention, but they are not intended to limit it thereto; the parts are parts by weight:

(1) 42 parts of sodium-1-amino-4-anilido-anthraquinone-2-sulfonate are dissolved in 1000 parts of water, and to this solution is added at about 40° C. a solution of 18,5 parts of dicyclohexylamine in the calculated quantity of dilute hydrochloric acid. The dyebody of the following formula:

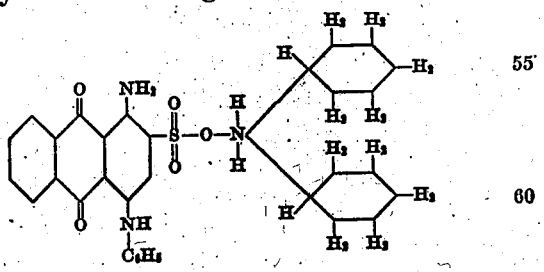

which soon separates is filtered by suction and dried. It forms a blue powder dissolving in concentrated sulfuric acid to an almost colorless solution which on addition of formaldehyde assumes a green, on addition of boric acid in the heat a blue color. It is insoluble in water, soluble in alcohol, acetone, benzyl alcohol, cyclohexanone and cyclohexanol to a blue solution.

(2) 62 parts of sodium-para-nitrophenyl-azosalicylate are dissolved in about 2000 parts of water, and to this solution are added at room temperature about 35 parts of quinoline hydrochloride dissolved in water. The yellow precipitate is filtered by suction and dried. It constitutes an orange-yellow powder dissolving in concentrated sulfuric acid, acetone and benzyl alcohol to a reddish-yellow, in alcohol and benzene to a yellow solution. It has following formula:

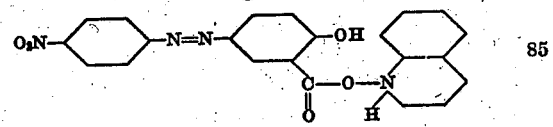

(3) To 20 parts of the dyestuff of the following formula:

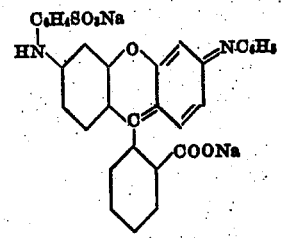

are added in an aqueous solution at about 100

10° C. to 20° C. 10 parts of ethenyl-phenylenediamine of the following formula:

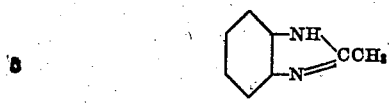

(about 2 molecular proportions) dissolved in the calculated quantity of dilute hydrochloric acid, the resulting precipitate is filtered by suction and dried. It forms a dark violet powder which is almost insoluble in water and soluble in alcohol to a reddish-violet, in benzyl alcohol to a bluish-violet solution. Its solution in concentrated sulfuric acid is yellowish-red, which on addition of formaldehyde changes slowly to bluish-red. It has the following formula:

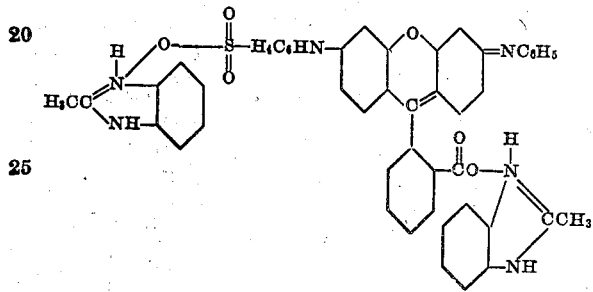

These pigments as such or after being mechanically mixed with one of the usual substrata as for instance aluminum hydroxide, heavy spar, blanc fixé (precipitated barium sulphate) or a mixture thereof may be rubbed on with varnish and printed, or rubbed on with linseed oil and spread, or brushed on with an aqueous binding agent, and thus yield very intense, clear shades of very good fastness to light.

The precipitation of the sodium salt of the dyestuff by means of a salt of an organic base can of course also be effected in the presence of substrata for instance of the above named aluminum hydroxide, heavy spar, blanc fixé, or mixtures thereof.

Instead of the above-indicated dyestuffs there may also be used other dyestuffs for producing pigment-dyes in the afore-described manner, for instance: 1-amino-4-para-acetanilido-2-anthraquinonesulfonic acid of the following formula:

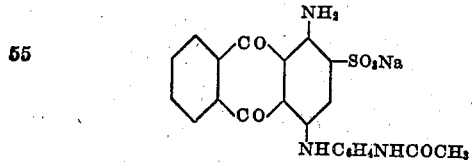

1.4-dihydroxy-5.8-di-para-toluidoanthraquinonedisulfonic acid; 1.5-dihydroxy-4.8-di-para-toluidoanthraquinonedisulfonic acid; 1.4-diamidoanthraquinone-2-sulfonic acid; 1-hydroxy-4-para-toluido-anthraquinonesulfonic acid; 1.5-di-para-toluidoanthraquinonedisulfonic acid; anthrapyrimidine-4-paratoluidosulfonic acid of the following formula:

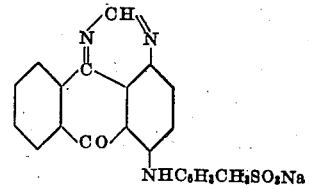

methylanthrapyridone-4-arylsulfonic acids of the following formula:

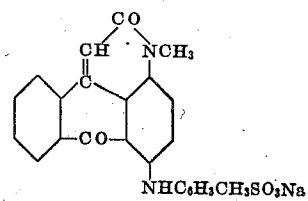

1.4 - diaminoanthraquinone - 2 - phenoxysulfonic acid of the following formula:

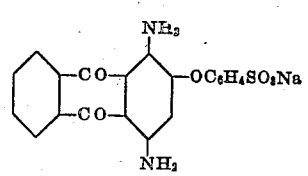

or the like.

Instead of the above-named acid anthraquinone-dyestuffs there may also be used other dyestuffs having acid groups, as for instance the dyestuffs of the following formulas:

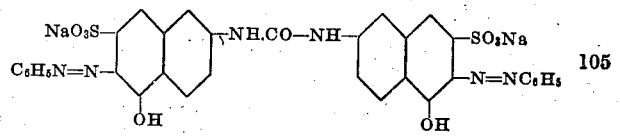

or

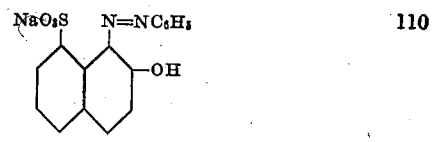

or the acid triphenylmethan dyestuff; Patent Blue A, whose constitution is of the following formula:

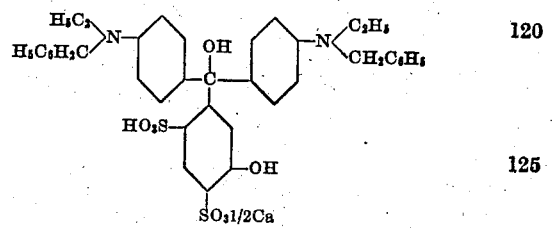

or the dyestuff obtainable by the action of ortho-toluidine upon fluoresceinchloride and sulfonation of the reaction product. It has the following formula:

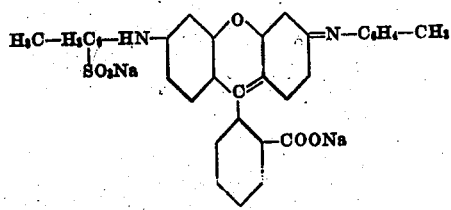

The organic bases serving as precipitating agents and yielding precipitates which are insoluble or sparingly soluble in water, are selected in each case according to the particular circumstances.

We claim:

1. The process of preparing pigment dyes which comprises treating an organic dyestuff containing acid salt-forming groups in the presence of a solvent with a cyclic base containing the following group:

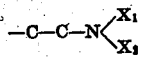

wherein the grouping —C—C— forms a part of a cyclic radical and wherein $X_1$ and $X_2$ stand for hydrogen, alkyl or —C—C—, or $X_1$ and $X_2$ together for =C—C—.

2. The process of preparing pigment dyes which comprises treating an organic dyestuff containing sulfo groups in the presence of a solvent with a cyclic base containing the following group:

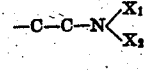

wherein the grouping —C—C— forms a part of a cyclic radical and wherein $X_1$ and $X_2$ stand for hydrogen, alkyl or —C—C—, or $X_1$ and $X_2$ together for =C—C—.

3. The process of preparing pigment dyes which comprises treating an anthraquinone dyestuff containing acid salt-forming groups in the presence of a solvent with a cyclic base containing the following group:

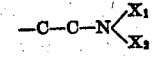

wherein the grouping —C—C— forms a part of a cyclic radical and wherein $X_1$ and $X_2$ stand for hydrogen, alkyl or —C—C—, or $X_1$ and $X_2$ together for =C—C—.

4. The process of preparing pigment dyes which comprises treating an anthraquinone dyestuff containing sulfo groups in the presence of a solvent which a cyclic base containing the following group:

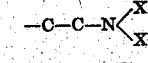

wherein the grouping —C—C— forms a part of a cyclic radical and wherein $X_1$ and $X_2$ stand for hydrogen, alkyl or —C—C—, or $X_1$ and $X_2$ together for =C—C—.

5. The process of preparing a pigment dye which comprises treating 1-amino-4-anilido-anthraquinone-2-sulfonic acid in the presence of a solvent with dicyclo-hexylamine.

6. The process of preparing pigment dyes which comprises treating a salt of an organic dyestuff containing acid salt-forming groups dissolved in water with a salt of a cyclic base containing the following group:

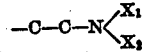

wherein the grouping —C—C— forms a part of a cyclic radical and wherein $X_1$ and $X_2$ stand for hydrogen, alkyl or —C—C—, or $X_1$ and $X_2$ together for =C—C—.

7. The process of preparing pigment dyes which comprises treating a salt of an organic dyestuff containing sulfo groups dissolved in water with a salt of a cyclic base containing the following group:

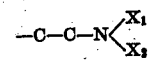

wherein the grouping —C—C— forms a part of a cyclic radical and wherein $X_1$ and $X_2$ stand for hydrogen, alkyl or —C—C—, or $X_1$ and $X_2$ together for =C—C—.

8. The process of preparing pigment dyes which comprises treating a salt of an anthraquinone dyestuff containing acid salt-forming groups dissolved in water with a salt of a cyclic base containing the following group:

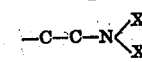

wherein the grouping —C—C— forms a part of a cyclic radical and wherein $X_1$ and $X_2$ stand for hydrogen, alkyl or —C—C—, or $X_1$ and $X_2$ together for =C—C—.

9. The process of preparing pigment dyes which comprises treating a salt of an anthraquinone dyestuff containing sulfo groups dissolved in water with a salt of a cyclic base containing the following group:

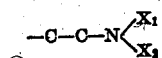

wherein the grouping —C—C— forms a part of a cyclic radical and wherein $X_1$ and $X_2$ stand for hydrogen, alkyl or —C—C—, or $X_1$ and $X_2$ together for =C—C—.

10. The process of preparing a pigment dye which comprises treating sodium-1-amino-4-anilidoanthraquinone-2-sulfonate dissolved in water with dicyclohexylamine-hydrochloride.

11. As new products pigments dyes being salts formed on the one side from an organic dyestuff containing acid salt-forming groups and on the other side from a cyclic base containing the following group:

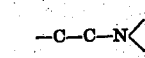

wherein the grouping —C—C— forms a part of a cyclic radical and wherein $X_1$ and $X_2$ stand for hydrogen, alkyl or —C—C—, or $X_1$ and $X_2$ together for $=C-C-$ and having a basicity sufficient for the formation of a stable salt, said pigment dyes being soluble in a great number of organic solvents and most of the pigment dyes yielding clear tints of good fastness to light.

12. As a new product a pigment dye of the formula:

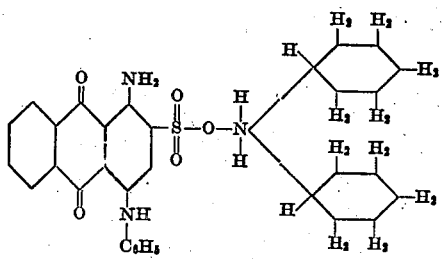

being a blue powder insoluble in water, soluble in alcohol, acetone, benzyl-alcohol, cyclohexanone and cyclohexanol to a blue solution and yielding a clear tint of great fastness to light.

13. As a new product, a pigment dye of the following probable formula:

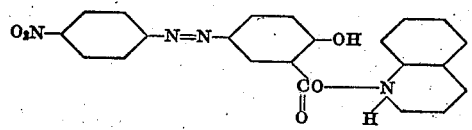

being an orange yellow powder, dissolving in concentrated sulfuric acid, acetone and benzyl-alcohol to a reddish-yellow, in alcohol and benzene to a yellow solution.

In testimony whereof, we affix our signatures.

GEORG KRÄNZLEIN.
Dr. CHRISTOPH HARTMANN.
ALBIN HARDT.